United States Patent [19]

Losi, Jr.

[11] Patent Number: 5,178,251
[45] Date of Patent: Jan. 12, 1993

[54] MINIATURE VEHICLE DRIVE TRAIN PROTECTION ASSEMBLY

[75] Inventor: Gilbert E. Losi, Jr., Chino, Calif.

[73] Assignee: Team Losi, Inc., Chino, Calif.

[21] Appl. No.: 738,857

[22] Filed: Aug. 1, 1991

[51] Int. Cl.⁵ .................. F16D 13/44; F16D 43/20; F16D 47/06
[52] U.S. Cl. .................. 192/48.3; 192/56 R; 192/57; 192/58 A; 446/465; 464/24; 464/47
[58] Field of Search ............ 192/57, 3.21, 58 A, 192/48.3, 12 A, 56 R, 4 B; 464/24, 25, 47, 46, 45; 446/456, 465

[56] References Cited

U.S. PATENT DOCUMENTS

| 1,910,142 | 5/1933 | Wemp | 192/48.3 |
| 2,166,961 | 7/1939 | Marsh | 192/48.3 X |
| 2,260,581 | 10/1941 | Pollard | 192/57 X |
| 3,259,218 | 7/1966 | Black et al. | 192/4 B X |
| 3,488,980 | 1/1970 | Burrough | 464/25 |
| 3,865,216 | 2/1975 | Gryglas | 192/58 A X |
| 3,995,718 | 12/1976 | Nakamori | 192/56 R X |
| 4,000,793 | 1/1977 | Chung | 464/24 X |
| 4,120,388 | 10/1978 | Nisley | 192/58 A X |

FOREIGN PATENT DOCUMENTS 1222738 6/1960 France .................. 192/58 A

Primary Examiner—Rodney H. Bonck
Attorney, Agent, or Firm—Denton L. Anderson

[57] ABSTRACT

A drive train protection device for a miniature racing vehicle is provided. The device is disposed along the drive train between the vehicle motor and the transmission. The vehicle motor rotates an engagement wheel about an axis of rotation. The engagement wheel is frictionally engaged to a shaft section by a clutch. The shaft section is engaged to the transmission. An impeller is disposed about the shaft section within an impeller housing. The impeller is free to rotate about the shaft section but the impeller housing is affixed to the shaft section and, therefore, must rotate with the shaft section. The impeller is linked to rotate with the engagement wheel. The impeller housing is filled with a viscous liquid which resists the rotation of the impeller. Thus, the drive train is protected from over-torquing by the clutch connection between the engagement wheel and the shaft section, but slippage under normal racing conditions is minimized by the resistance to impeller rotation provided by the viscous liquid.

7 Claims, 5 Drawing Sheets

MINIATURE VEHICLE DRIVE TRAIN PROTECTION ASSEMBLY

BACKGROUND

This invention is directed generally to the field of miniature motorized racing vehicles, and, in particular, to devices for protecting the drive trains of such vehicles.

The racing of miniature, motorized, usually radio-controlled vehicles (commonly termed "RC" vehicles) has become a very popular hobby. For some, in fact, the racing of RC vehicles has become a serious international sport.

Like their full-sized cousins, a typical RC racing vehicle has a drive train which includes a transmission. The care and upkeep of vital drive train components has been found to be as necessary in RC vehicles as it is in full-sized vehicles.

In this regard, it has been found to be necessary to protect the drive train components in an RC racing vehicle from the sudden over-torquing caused when the vehicle bounces into the air at high speeds and then lands back on the track again. When the vehicle leaves the ground, the sudden lack of load on the drive wheels causes the motor to accelerate to very high rpms. When the vehicle comes to earth again, the sudden reintroduction of the load on the drive wheels can do serious damage to the drive train.

Prior art methods of protecting RC vehicle drive trains have generally employed one or more clutch assemblies. When the drive train is suddenly over-torqued, a clutch plate is allowed to slip within the assembly, thereby protecting the drive train components.

There is a problem, however, with the use of such clutch assemblies. To adequately protect the more fragile drive train components, the slippage threshold on the clutch plate must often be set so low that the clutch assembly tends to slip during normal operations. The problem is most commonly experienced during accelerations and operations at high speeds, and can become acute after the clutch plate becomes hot. Such slippage can severely impair the performance of the racing vehicle.

Accordingly, there is a need for a practical, inexpensive device which is capable of protecting the drive train of a miniature, motorized racing vehicle, but which has a minimum tendency to slip under normal racing conditions.

SUMMARY OF THE INVENTION

The invention satisfies these needs.

The invention is a unique assembly disposed within the vehicle drive train. The assembly comprises a shaft section, a rotating engagement wheel, a clutch, and an impeller disposed within an impeller housing.

The engagement wheel is engaged to the motor in such a way that the rotation of the motor causes a rotation of the engagement wheel. The shaft section is engaged to the drive wheels in such a way that the rotation of the shaft section causes the rotation of the drive wheels.

The clutch provides a means for frictionally engaging the engagement wheel to the shaft section in such a way that the rotation of the engagement wheel causes the rotation of the shaft section about its longitudinal axis.

The impeller is comprised of at least five vanes radiating from a central hub. The hub is connected to the engagement wheel in such a way that the rotation of the engagement wheel causes the rotation of the impeller about the shaft section.

The impeller housing is comprised of a first impeller housing moiety and a second impeller housing moiety. One or both of the impeller housing moieties is fixed to the shaft section so that the impeller housing rotates with the shaft section.

In operation, the impeller housing is filled with a viscous liquid such as ethylene glycol. Under normal racing conditions, the operation of the motor causes the rotation of the engagement wheel. Via the clutch linkage, the rotation of the engagement wheel causes the rotation of the shaft section. The rotation of the shaft section, in turn, causes the rotation of the drive wheels. The clutch assembly is adjusted so that, whenever there is a sudden differential in the rotating velocities of the motor and the drive wheels, the clutch plate slips vis-a-vis the engagement wheel to prevent damage to the drive train. Under normal racing conditions, however, the tendency of the motor-engagement wheel-impeller moiety of the drive train to slip relative to the drive wheel-shaft section-backing plate moiety of the drive train is minimized by the resistance to impeller rotation provided by the viscous liquid.

The invention provides an inexpensive, practical method of protecting the drive train of a miniature racing vehicle while minimizing any problem of slippage.

DESCRIPTION OF THE DRAWINGS

The invention is further described below with reference to the accompanying drawings, wherein.

DETAILED DESCRIPTION OF THE INVENTION

Figure 1:
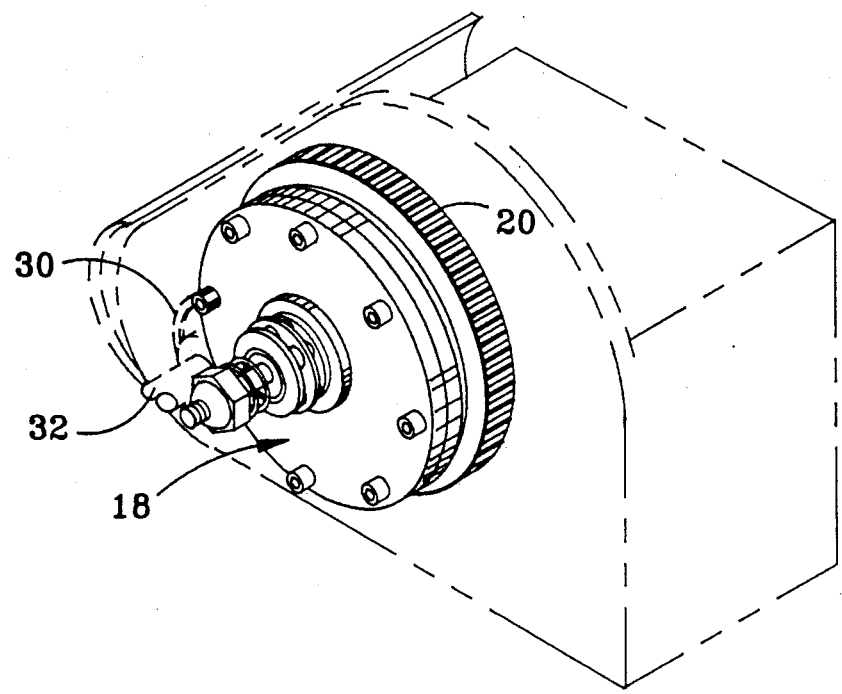
FIG. 1 is a perspective view of a drive train protection device having features of the invention.
Figure 2:
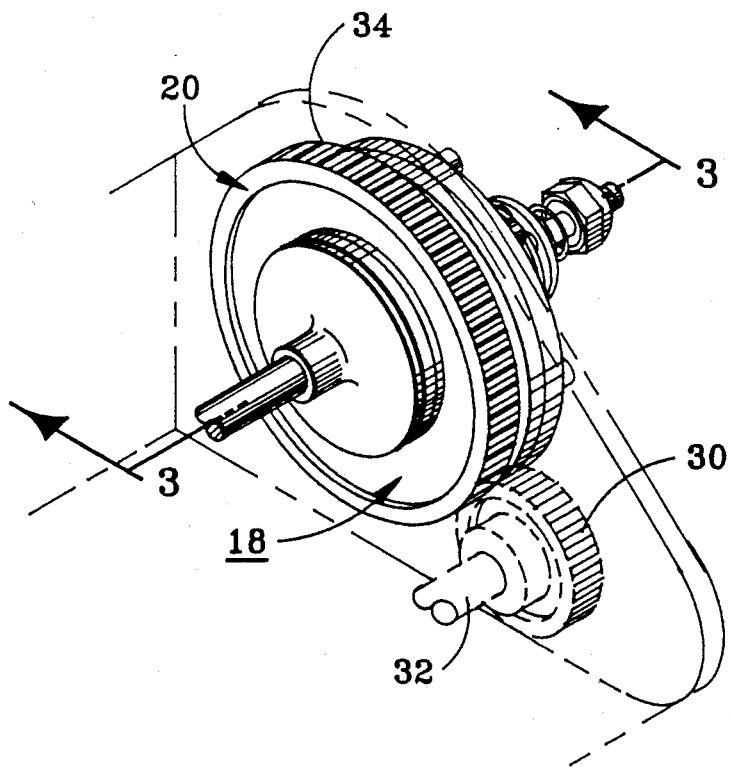
FIG. 2 is a second perspective view of the drive train protection device FIG. 1.
Figure 3:
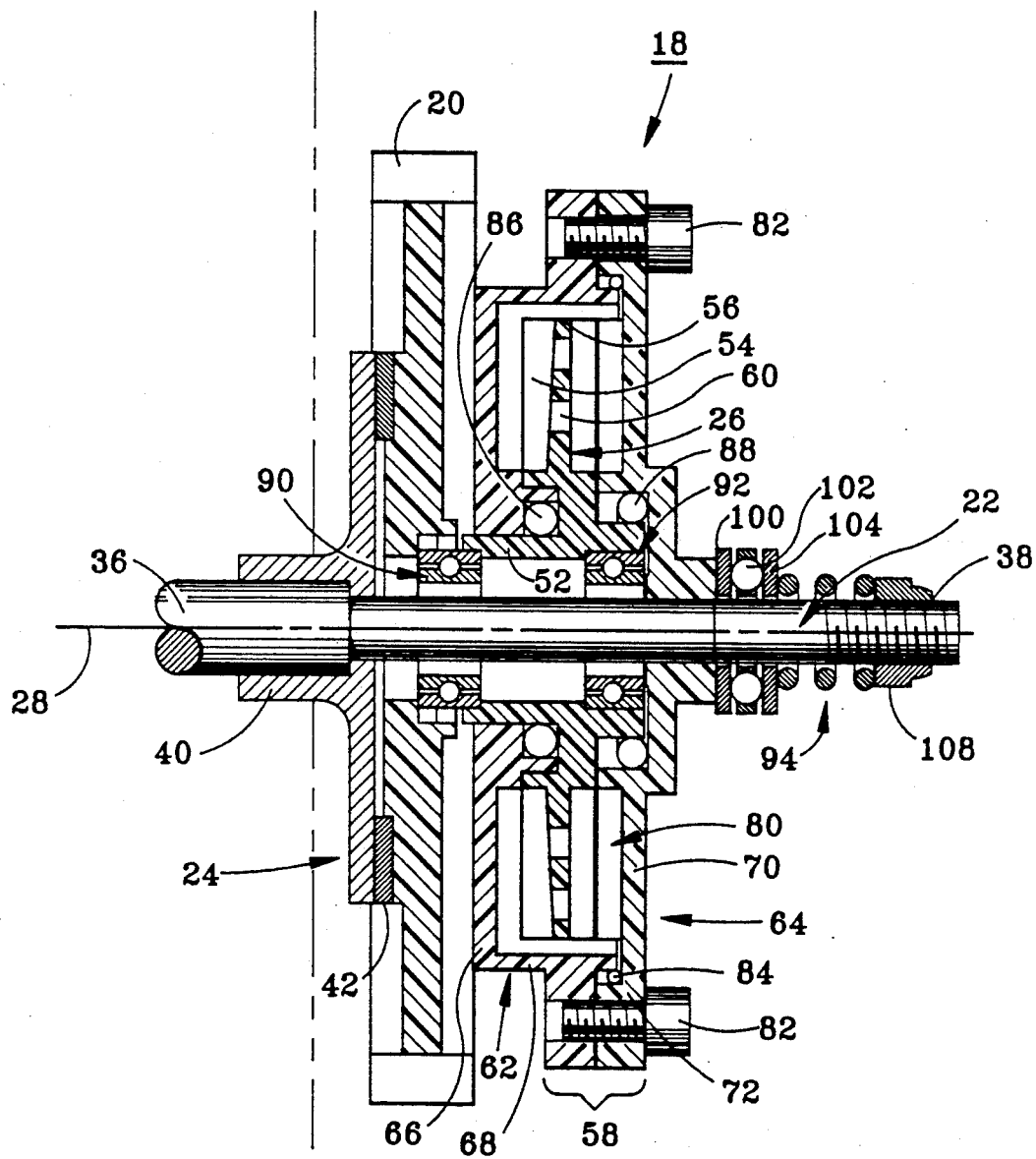
FIG. 3 is a cross-sectional view of the drive train protection device of FIGS. 1 and 2 taken along line 3—3.
Figure 4:
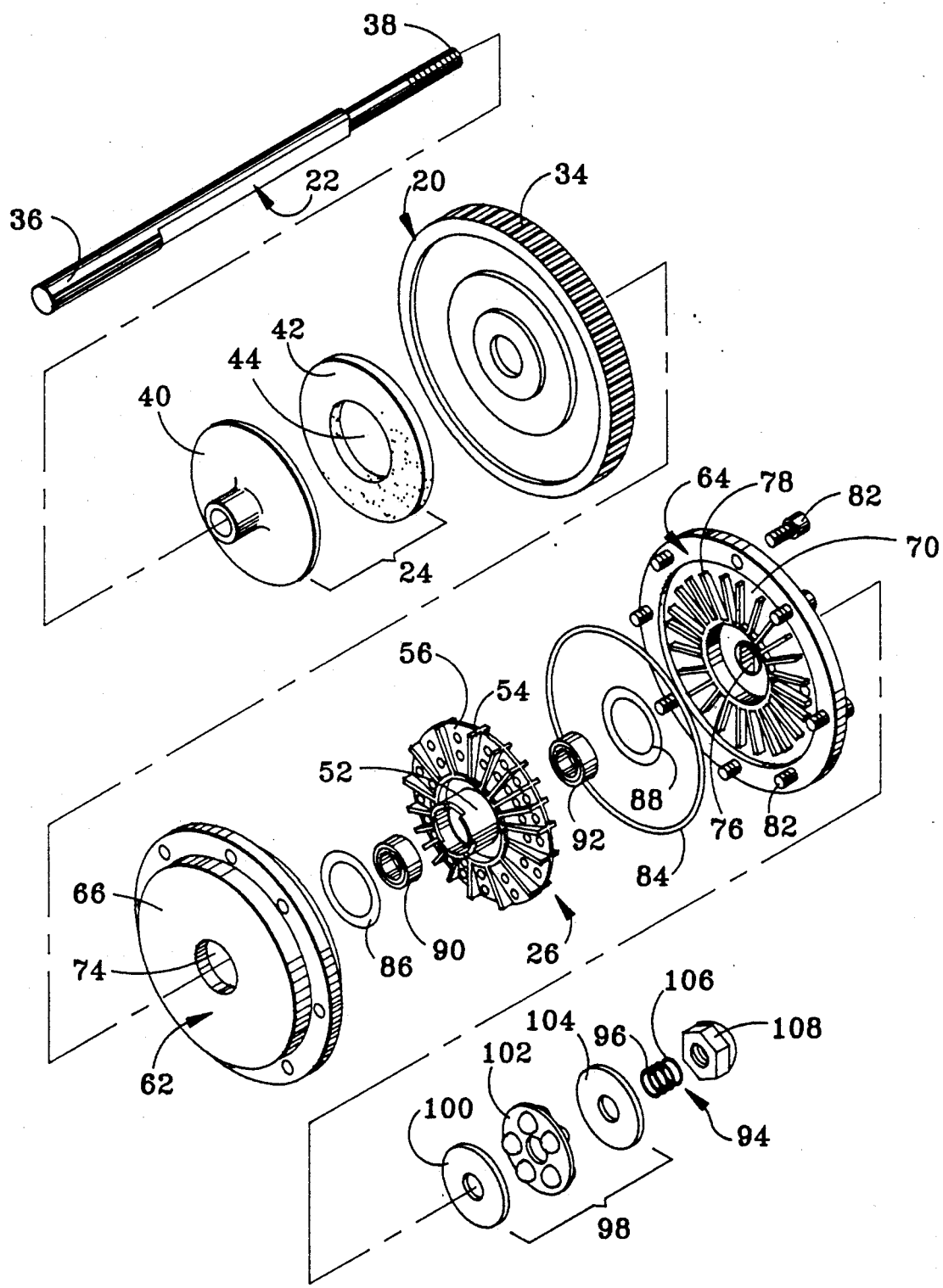
FIG. 4 is an exploded view of the drive train projection device of FIGS. 1, 2 and 3.
Figure 5:
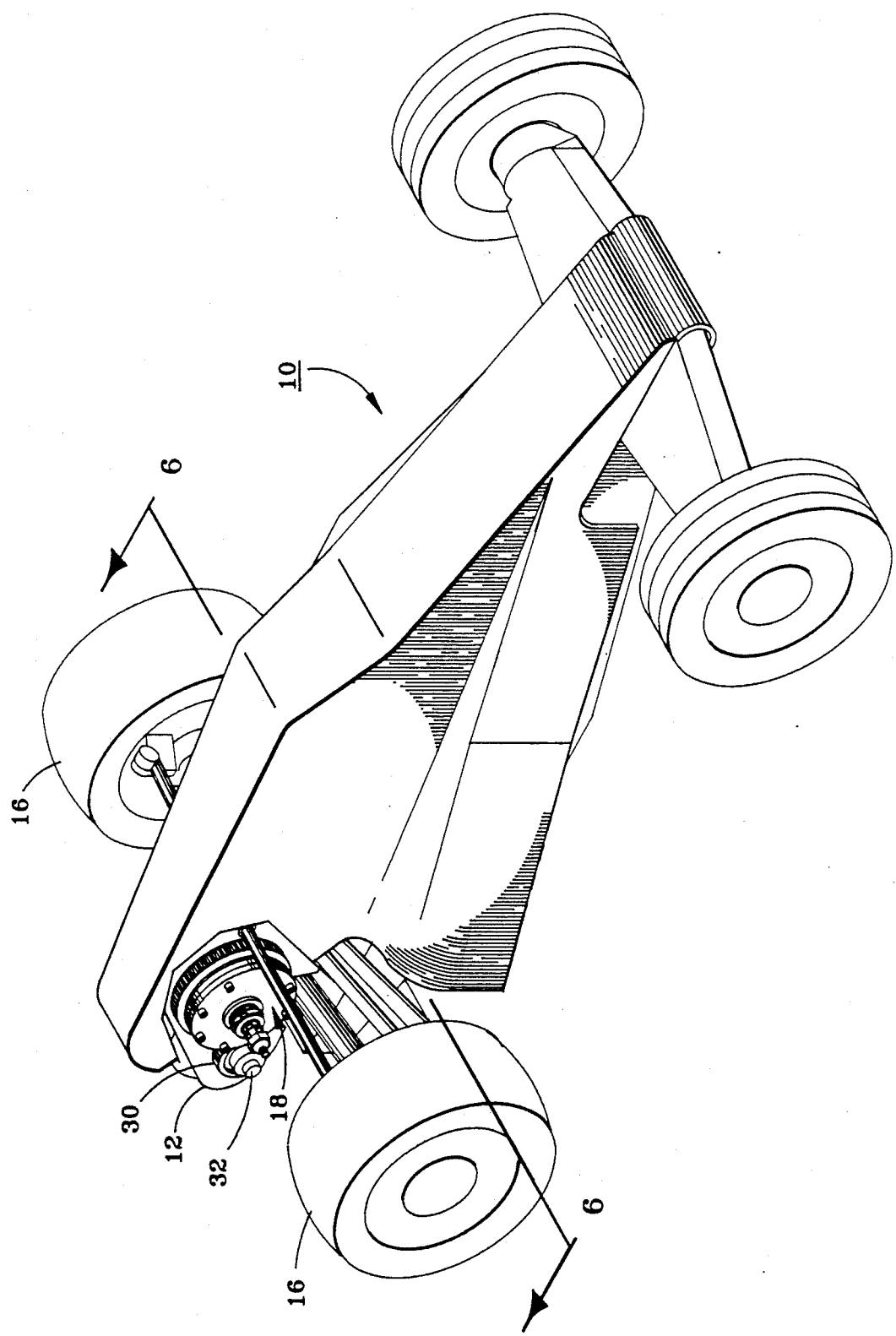
FIG. 5 is a perspective view of a miniature racing vehicle having features of the invention.
Figure 6:
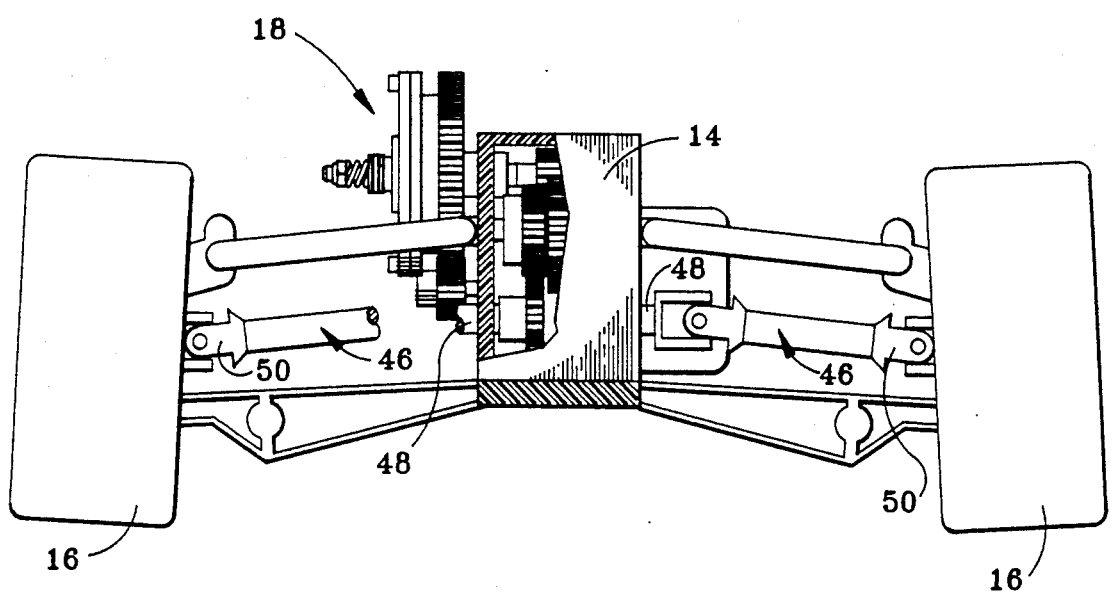
FIG. 6 is a section view taken along line 6—6, shown in partial cut-away, of the racing vehicle of FIG. 5.

The following discussion describes in detail several embodiments of the invention. This discussion, however, should not be construed as limiting the invention to those particular embodiments. Practitioners skilled in the art will recognize numerous other embodiment as well. For a definition of the complete scope of the invention, the reader is directed to the appended claims.

As shown in the drawings, a vehicle 10 having features of the invention comprises a motor 12, a transmission 14, one or more drive wheels 16, and a drive train protection assembly (shown generally as 18). The vehicle of the invention 10 generally weighs less than about 25 pounds and usually less than about 7 pounds. It has a wheel base less than about 12 inches. Its overall dimensions are usually less than about 15 inches wide and about 20 inches long. The vehicle 10 can be radio controlled and would thus further comprise radio receiving equipment and associated operations, control switches and equipment (not shown).

The motor 12 can be any of the miniature vehicle motors known in the art. In a typical RC racing vehicle, the motor 12 is an electric motor weighing about 6 ounces and developing power of between about 0.25 and 0.50 electrical horsepower.

Typically, the transmission 14 is a standard transmission having 2–8 gears.

The vehicle 10 can have one or more drive wheels 16. In the embodiment shown in the drawings, the drive wheels 16 are provided by the pair of wheels at the rear of the vehicle 10.

The drive train protection assembly 18 of the invention comprises an engagement wheel 20, a shaft section 22, clutch means for frictionally engaging the engagement wheel to the shaft section (shown generally in the drawings as 24) and an enclosed impeller 26.

The engagement wheel 20 is adapted to rotate about an axis of rotation 28. In the embodiment shown in the drawings, the engagement wheel 20 is a gear. Typically, the engagement wheel 20 is made from a nylon or other strong plastic. Preferably, the engagement wheel 20 is temperature-resistant to at least about 300° F., more preferably, to at least about 500° F.

A first engagement means is provided to engage the engagement wheel 20 to the motor 12 in such a way that the rotation of the motor 12 causes the rotation of the engagement wheel 20. In the embodiment illustrated in the drawings, the first engagement means is provided by an engagement gear 30 disposed at the end of the motor drive shaft 32 which meshes with the gear teeth 34 on the engagement wheel 20.

The shaft section 22 is a short, linear shaft element having a first end 36, a second end 38, and a longitudinal axis which is co-axial with the axis of rotation 28 of the engagement wheel 20. The shaft section 22 is typically made from a metal, such as a steel or an alloy of aluminum.

The clutch means 24 for frictionally engaging the engagement wheel 20 to the shaft section 22 is provided in the embodiment illustrated in the drawings by a backing plate 40 and a clutch pad 42. The backing plate 40 is rigidly affixed to the shaft section 22 so that the backing plate 40 rotates with the shaft section 22. The backing plate 40 can be made from any suitable material. Plastics or metals can be used. Typically, the backing plate 40 is made from aluminum.

The clutch pad 42 is sandwiched between the backing plate 40 and the engagement wheel 20. To facilitate this, the clutch pad 42 has a central aperture 44 so that the clutch pad 42 is easily disposed around the shaft section 22. Typically, the clutch pad 42 is between about 0.03 inches and about 0.06 inches thick. The clutch pad 42 can be circular and have a circular central aperture 44. In such embodiments, the difference in the radius of the central aperture 44 and the radius of the clutch pad 42 is typically about ⅜ inches. The clutch pad 42 can be made from natural fibers. Typically, fibers containing mica and/or ceramic fillers are used for better dissipation of heat.

A second engagement means is provided for engaging the shaft section 22 to the drive wheel 16 in such a way that the rotation of the shaft section 22 causes the rotation of the drive wheel 16. In the embodiment illustrated in the drawings, the second engagement means is provided by (1) the transmission 14 which is directly engaged by the shaft section 22, and (2) a pair of rear drive wheel shafts 46 each of which is directly connected to the transmission 14 at a first end 48 and to the drive wheels at the opposite end 50.

The impeller 26 is comprised of a hollow central hub 52 and at least five evenly spaced vanes 54 of equal length. The precise shape of the vanes 54 is not critical. In the embodiment illustrated in the drawings, each of the vanes 54 has a flat, paddle-like configuration affixed to the central hub 52 with the flat side facing in the direction of rotation. The number of impeller vanes 54 is also not critical. Typically, the impeller 26 has between about 10 and about 20 vanes 54. Impellers 26 having between about 15 and about 20 vanes 54 can be used.

Typically, the impeller 26 is less than about 4 inches in diameter. An impeller 26 having a diameter between about ½ inch and about 2 inches can be used. For typical RC racing vehicles, the impeller 26 has a diameter between about 1 inch and about 1.5 inches.

For strength, the vanes 54 can be interconnected by a planar web 56. As will be discussed below, the impeller 26 is disposed within an impeller housing 58 which is filled with a viscous liquid. For this reason, the web 56 has apertures 60 to allow the viscous liquid to flow from one side of the web 56 to the other. Preferably, the web 56 has an aperture 60 between each of the vanes 54.

It is important that the impeller 26 be made from a material which is relatively heat resistant, preferably resistant to temperatures of up to 500° F. It is also important that the impeller 26 be made from: (1) a material with a relatively high tensile strength, (2) a material which is resistant to a chemical attack by the viscous liquid and (3) a material one which has a relatively low coefficient of thermal expansion. The impeller 26 can be made from alloys of aluminum. For ease of manufacture, the impeller 26 is preferably made from a polyphenylene sulfide material, reinforced with fiberglass. A polyphenylene sulfide material reinforced with about 40% fiberglass has been found to work well in the invention.

The impeller 26 is disposed within an impeller housing 58. The impeller housing 58 is comprised of a first impeller housing moiety 62 and a second impeller housing moiety 64. The first impeller housing moiety 62 comprises a circular first impeller housing moiety base wall 66 and a first impeller housing moiety side wall 68 affixed at right angles to the first impeller housing moiety base wall 66. Likewise, the second impeller housing moiety 64 comprises a circular second impeller housing moiety base wall 70 and a second impeller housing moiety side wall 72 affixed at right angles to the second impeller housing moiety base wall 70. The first impeller housing moiety base wall 66 has a first impeller housing moiety central aperture 74 and the second impeller housing moiety base wall has a second impeller housing moiety central aperture 76.

Preferably, the inside face of at least one of the impeller housing moiety base walls 66 or 70 defines at least two, evenly spaced ridges 78 radiating from the central aperture of that base wall towards the side wall of that moiety. Such ridges 78 provide an additional impediment to the flow of the viscous liquid within the impeller housing 58 so as to further inhibit the rotation of the impeller 26 when the impeller housing 58 is filled with a viscous liquid.

The first impeller housing moiety 62 and the second impeller housing moiety 64 are sealed together at the intersection of their respective side walls to form an impeller enclosure 80. In the embodiment illustrated in the drawing, the first impeller housing moiety 62 and the second impeller housing moiety 64 are connected together by self tapping screws 82 and are sealed by a large O-ring 84, a first small O-ring 86 and a second small O-ring 88.

Preferably, the diameter of the impeller 26 is between about 0.001 inches and about 0.005 inches less than the internal diameter of the impeller enclosure 80. Also, it is preferable that the clearance between the impeller vanes 54 and both the first and second impeller moiety base walls 66 and 70 is between about 0.001 inches and about 0.005 inches.

The impeller housing 58 is affixed to the shaft section 22 so that the impeller housing 58 rotates with the shaft section 22. The impeller 26 is disposed within the impeller housing 58 in such a way that the impeller hub 52 is aligned with the first and second impeller housing moiety central apertures 74 and 76.

The impeller hub 52 is linked to the engagement wheel 20 in such a way that the rotation of the engagement wheel 20 causes the rotation of the impeller 26 about the axis of rotation 28. In the embodiment illustrated in the drawing, the impeller hub 52 protrudes through the first impeller housing moiety central aperture 74 to attach to the engagement wheel 20.

The impeller 26 and the engagement wheel 20 are rotatably disposed about the shaft section 22 so that both the impeller 26 and the engagement wheel 20 can rotate freely about the shaft section 22. For this reason, in the embodiment illustrated in the drawings, the shaft section 22 has a circular cross-section proximate to the impeller 26 and to the engagement wheel 20. The impeller 26 and the engagement wheel 20 are rotatably mounted to the shaft section 22 by a first ball bearing assembly 90 and a second ball bearing assembly 92.

In the embodiment illustrated in the invention, the shaft section 22 is keyed proximate to the backing plate 40 and to the second impeller housing moiety central aperture 76 to accomplish the affixing of the backing plate 40 and the impeller housing 58 to the shaft section 22 in such a way that the rotation of the shaft section 22 causes the rotation of the backing plate 40 and the impeller housing 58.

Preferably, the first impeller housing moiety 62, the impeller 26, the second impeller housing moiety 64 and the engagement wheel 20 are slidably affixed to the shaft section 22 so that a laterally adjustable pressure can be applied to the clutch pad 42. In the embodiment illustrated in the drawings, a coiled compression spring 94 is disposed about the second end 38 of the shaft section 22 to urge the first impeller housing moiety 62, the impeller 26, the second impeller housing moiety 64 and the engagement wheel 20 in the direction of the clutch pad 42. The coiled compression spring 94 impinges at a first end 96 against a third ball bearing assembly 98 comprised of a first washer 100, a ball bearing unit 102 and second washer 104. The coiled spring 94 impinges at its opposite end 106 against a threaded cap 108. The compressive tension on the coiled spring 94 is adjustable by the rotation of the threaded cap 108 along the second end 38 of the shaft section 22.

The viscous liquid which is used in operation to fill the impeller housing may be any suitable liquid having a suitable viscosity. It is preferable that the liquid be resistant to thermal breakdown at temperatures at least as high as 500° F. It is further preferable that the viscous liquid be non-corrosive to the impeller 26 and impeller housing 58. Finally, it is preferable that the viscous liquid have a relatively low surface tension so that it will not foam excessively. A glycol can be used, with ethylene glycol being preferred. A 5 weight ethylene glycol and a 10 weight ethylene glycol have been found to have little anti-slip effect for typical RC vehicles. However, ethylene glycol grades 20 weight through 120 weight have been found to have substantial anti-slip effect In the embodiment illustrated in the drawings, the drive train protection assembly 18 is operatively disposed between the motor 12 and the transmission 14. Those of skill in the art will recognize that the drive train protection assembly 18 can also be operatively disposed between the transmission 14 and the drive wheels 16. Also in the embodiment illustrated in the drawings, the engagement wheel 20 is directly connected to the motor 12 and the shaft section 22 is directly connected to the drive wheels 16. Those of skill in the art will recognize that the drive train protection assembly 18 would also work if reversed (with the engagement wheel 20 directly connected to the drive wheels 16 and the shaft section 22 directly connected to the motor 12).

In operation, the impeller housing 58 is filled with a viscous liquid. Under normal racing conditions, the operation of the motor 12 causes the rotation of the engagement wheel 20. Via the clutch assembly 24, the rotation of the engagement wheel 20 causes the rotation of the shaft section 22. The rotation of the shaft section 22, in turn, causes the rotation of the drive wheels 16. The clutch assembly 24 is adjusted so that, whenever there is a sudden differential in the rotating velocities of the motor 12 and the drive wheels 16, the backing plate 40 slips vis-a-vis the engagement wheel 20 to prevent damage to the drive train components. Under normal racing conditions, however, the tendency of the motor-engagement wheel-impeller moiety of the drive train to slip relative to the drive wheel-shaft section-backing plate moiety of the drive train is minimized by the resistance to impeller rotation provided by the viscous liquid.

The invention provides an inexpensive, practical method of protecting the drive train of a miniature racing vehicle. With the combination of the invention installed, the drive train of a miniature racing vehicle is protected against over-torquing but will not appreciable slip under ordinary racing conditions.

Although the present invention has been described in considerable detail with reference to certain preferred versions, many other versions should be apparent to those skilled in the art. Therefore, the spirit and scope of the appended claims should not necessarily be limited to the description of the preferred versions contained herein.

What is claimed is:

1. In a miniature vehicle having a motor and at least one drive wheel, an assembly comprising:
   (a) an engagement wheel adapted to rotate about an axis of rotation;
   (b) first engagement means for engaging the engagement wheel to the motor in such a way that the rotation of the motor causes the rotation of the engagement wheel;
   (c) a shaft section having a first end, a second end and a longitudinal axis, the longitudinal axis being coaxial with the axis of rotation;

(d) second engagement means for engaging the shaft section to the drive wheel in such a way that the rotation of the shaft section causes the rotation of the drive wheel;

(e) clutch means for frictionally engaging the engagement wheel to the shaft section in such a way that the rotation causes the rotation of the shaft section about its longitudinal axis, the clutch means comprising (i) a backing plate affixed to the shaft section and (ii) a clutch pad having a central aperture and being disposed about the drive shaft in such a way that it is sandwiched between, and in contact with, the backing plate and the engagement wheel;

(f) a first impeller housing moiety comprising a circular first impeller housing moiety base wall and a first impeller housing moiety side wall affixed at right angles to the first impeller housing moiety base wall, the first impeller housing moiety base wall, the first impeller housing moiety base wall having a first impeller housing moiety central aperture;

(g) a second impeller housing moiety comprising a circular second impeller housing moiety base wall and a second impeller housing moiety side wall affixed at right angles to the second impeller housing moiety base wall, the second impeller moiety base wall having a second impeller housing moiety central aperture;

(h) connection means for connecting the first impeller housing moiety side wall to the second impeller housing moiety side wall to form an impeller housing which defines an impeller enclosure; and (i) an impeller disposed within the impeller enclosure and comprising a hollow central hub and at least five evenly spaced vanes of equal length;

wherein the shaft section is disposed through the first impeller housing moiety central aperture, the hollow hub of the impeller and the second impeller housing moiety central aperture;

wherein the shaft section is attached to the impeller housing perpendicular to the first and second impeller housing moiety base walls so that the rotation of the shaft section causes the rotation of the impeller housing about the first and second impeller housing moiety central aperture;

wherein the impeller hub is linked to the engagement wheel in such a way that the rotation of the engagement wheel causes the rotation of the impeller about the axis of rotation; and wherein the first and second housing moiety central apertures are sealed to prevent leakage of fluid disposed within the impeller enclosure.

2. The assembly of claim 1 wherein the first impeller housing moiety, the impeller, the second impeller housing moiety and the engagement wheel are slidably affixed to the shaft section in such a way that they can be collectively slid along the shaft section to apply pressure to the clutch pad, and wherein the first impeller housing moiety, the impeller, the second impeller housing moiety, and the engagement wheel are urged against the clutch pad by a spring.

3. The assembly of claim 2 wherein the spring is a coiled compression spring.

4. The assembly of claim 2 wherein the backing plate is disposed at the first end of the shaft section and the spring is disposed at the second end of the shaft section.

5. The assembly of claim 4 wherein the spring impinges upon a cap which is threaded onto one end of the shaft section.

6. The assembly of claim 1 wherein the vanes are interconnected web having a plurality of apertures to allow fluid to flow from one side of the web to the other.

7. The assembly of claim 6 wherein the web comprises an aperture between each of the vanes.

* * * * *